(12) United States Patent
Truong et al.

(10) Patent No.: US 8,102,939 B2
(45) Date of Patent: Jan. 24, 2012

(54) LINK ADAPTATION

(75) Inventors: Hong Linh Truong, Adliswil (CH); Andre Noll Barreto, Rio de Janeiro (BR); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 12/120,342

(22) Filed: May 14, 2008

(65) Prior Publication Data
US 2008/0259785 A1 Oct. 23, 2008

(51) Int. Cl.
H04L 27/00 (2006.01)
(52) U.S. Cl. .......... 375/295; 375/219; 375/319; 455/73; 714/708
(58) Field of Classification Search .................. 375/295, 375/219, 319; 455/73; 714/708
See application file for complete search history.

(56) References Cited

U.S. PATENT DOCUMENTS

| 5,862,171 | A * | 1/1999 | Mahany ......................... 375/132 |
| 6,643,322 | B1 * | 11/2003 | Varma et al. .................. 375/227 |
| 7,095,719 | B1 * | 8/2006 | Wilhelmsson et al. ....... 370/252 |
| 7,388,919 | B2 * | 6/2008 | Varma et al. .................. 375/259 |
| 2005/0220117 | A1 * | 10/2005 | Omi et al. .................. 370/395.4 |
| 2005/0286410 | A1 * | 12/2005 | Truong et al. ................. 370/216 |
| 2006/0098582 | A1 * | 5/2006 | Varma et al. .................. 370/252 |
| 2008/0259785 | A1 * | 10/2008 | Truong et al. ................. 370/217 |

* cited by examiner

*Primary Examiner* — David C. Payne
*Assistant Examiner* — Zewdu Kassa
(74) *Attorney, Agent, or Firm* — Michael J. Buchenhorner; Vazken Alexanian

(57) ABSTRACT

The present invention discloses an apparatus and method for adapting a transmission parameter in a transmitting node of a data communication system to the current link quality of a data communication channel. The adapted transmission parameter is selected by the transmitting node from a set of transmission parameters in dependence on a number of successful transmissions. The number of successful transmissions is compared in the transmitting node against one of a first threshold value corresponding to a first state of the transmitting node and a second threshold value corresponding to a second state of the transmitting node. The method comprises in the transmitting node the steps of (a) counting the number of successful transmissions; (b) selecting the adapted transmission parameter (b1) in response to the number of successful transmissions equaling or exceeding the first threshold value when the transmitting node is in the first state, and (b2) in response to the number of successful transmissions equaling or exceeding the second threshold value when the transmitting node is in the second state; and in dependence of the result of a following transmission, operating the transmitting node in one of the first state and the second state.

4 Claims, 2 Drawing Sheets

LINK ADAPTATION

TECHNICAL FIELD

The present invention is related to an apparatus and method for adapting transmission parameters to the current quality of a transmission channel. More particularly, the invention allows to adapt a variable data rate or a packet length or both to the channel conditions in a wireless local area network.

BACKGROUND OF THE INVENTION

Wireless local area networks (WLANs) have been designed for data communication and have found widespread acceptance and proliferation in the industry. Two wireless broadband LANs (WLANs) are standardized in the 5 GHz band, namely IEEE 802.11a and ETSI HIPERLAN/2. The physical layers of both standards are very similar: they both use a modulation technique called "Orthogonal Frequency Division Multiplexing (OFDM)" and can provide up to 8 different transmission modes with data rates ranging from 6 Mbps up to 54 Mbps. This multi-rate capability enables a WLAN station to select a transmission mode which is best appropriate to the current radio channel quality to reach the best performance.

In general, adaptive adjustment of the transmission rate is achieved by having a receiver estimating the channel link quality, deriving from this estimation the rate to be used in future transmissions, and sending this information back to the transmitter. The main issues for an efficient link adaptation mechanism are the determination of the parameters to be used for the link quality estimation, e.g. packet error rate, signal to noise ratio, received signal strength, carrier to interference ratio, etc., how to measure them, and how to select the appropriate rate out of the measurement results.

In HIPERLAN/2, it is the responsibility of an Access Point (AP) to dynamically select any of the available PHY (physical layer) modes for the down- and uplink transmissions. A Mobile Terminal (MT) continuously measures the quality of the downlink and suggests a suitable downlink transmission rate to the AP. For the uplink the AP itself performs the link quality estimation. The standard however does not specify how the link quality estimation and the corresponding transmission mode selection are performed. S. Simoens and D. Bartolomé describe in their article "Optimum performance of link adaptation in HIPERLAN/2 Networks", VTC 2001, a method for estimating the SNIR (Signal to Noise plus Interference Ratio) and based on this estimation determining the transmission rate that would maximize the throughput of an HIPERLAN/2 network. Similarly, Z. Lin, G. Malmgren, and J. Torsner studied in their article "System Performance Analysis of Link Adaptation in HiperLAN Type 2", VTC Fall 2000, the performance of the link adaptation of HIPERLAN/2 when using a C/I (Carrier to Interference ratio) as link quality parameter.

The standard IEEE 802.11 only specifies which transmission rates are allowed for which types of MAC (medium-access-control layer) frames, but not how and when to switch between the permitted rates. Furthermore, there is no signaling mechanism specified which would allow a receiver to inform the transmitter about the quality of the communication channel or the rate to be used. The transmitter can change the rate at any time between two consecutive packets, but not in the middle of a sequence of MAC frames belonging to the same packet. The rate at which a MAC frame is transmitted is coded in the header of the physical layer (the so-called PLCP header) which is sent at a fixed rate (6 Mbps in case of IEEE 802.11a) supported by all stations. Thus, after having decoded successfully the PLCP header, the receiver switches to the indicated rate to receive the MAC frame.

Although IEEE 802.11 WLANs are becoming more and more popular, little has been published about the rate adaptation techniques that could be applied to those networks. A. Kamerman and L. Montean describe in "WaveLAN-II: A High-Performance Wireless LAN for the Unlicensed Band", Bell Labs Technical Journal, Summer 1997, pp. 118-133, a method used in Lucent's WaveLAN-II devices. It is basically an automatic method for switching between two transmission rates, with the high one as the default operating rate. The device switches automatically to the low rate after two consecutive transmission errors and back to the high rate either after ten successful transmissions or after a time out.

As mentioned above, the IEEE 802.11 standard does not specify how rate switching should be executed in case of multi-rate PHY layers. It only specifies which rates have to be used for sending which MAC frames. It even does not provide any protocol means for a receiver to inform the transmitter about the actual link quality or the transmission rate to be used. That is why the link adaptation method described by G. Holland et. al. in "A Rate-Adaptive MAC Protocol for Multi-Hop Wireless Networks", ACM/IEEE International Conference on Mobile Computing and Networking (MOBICOM'01) Rome, Italy, July 2001, cannot be applied to current IEEE 802.11 WLANs, since it is based on the principle that the receiver determines the link quality and requests the transmitter to switch to a more appropriate rate.

From the above it follows that there is still a need in the art for an improved and efficient link adaptation method. Moreover, only information available at the transmitter side should be sufficient to guess whether the actual link quality is improving or worsening.

SUMMARY AND ADVANTAGES OF THE INVENTION

In accordance with the present invention, a method for adapting a transmission parameter in a transmitting node of a data communication system to the current link quality of a data communication channel is provided. The adapted transmission parameter is selected by the transmitting node from a set of transmission parameters in dependence on a number of successful transmissions s. The number of successful transmissions s is compared in the transmitting node against one of a first value s1 corresponding to a first state of the transmitting node and a second value s2 corresponding to a second state of the transmitting node. The method comprises in the transmitting node the steps of (a) counting the number of successful transmissions s; (b) selecting the adapted transmission parameter (b1) in response to the number of successful transmissions s equaling or exceeding the first value s1 when the transmitting node is in the first state, and (b2) in response to the number of successful transmissions s equaling or exceeding the second value s2 when the transmitting node is in the second state; and in dependence of the result of a following transmission, operating the transmitting node in one of the first state and the second state. The first value s1 is hereafter also referred to as first threshold value s1 and the second value s2 is hereafter also referred to as second threshold value s2.

Preferably, the second threshold value s2 is larger than the first threshold value s1, because then the first state can correspond to a link with fast changing quality and the second state can correspond to a link with slow changing quality.

In an embodiment the method can be used for adapting a variable data rate to the link quality, thereby supporting multiple transmission rates. Selecting the adapted transmission parameter in step (b) which is also contemplated as switching to the adapted transmission parameter then comprises switching to a different data rate. This allows the adaptation of the variable data rate to present channel conditions. In a further embodiment, the step of selecting the adapted transmission parameter can further comprise selecting a higher data rate from several data rates. Also a packet length different to the length employed before can be used. Moreover, the variable data rate, the different packet lengths, or other parameters can be combined. This shows the advantage that several transmission parameters can be adapted to the respective channel conditions.

The step of operating the transmitting node in the second state further comprises the transition to the first state in the event of a faulty transmission. This has the advantage that it can be switched directly from the second state to the first state, thereby coping with fast changing channel conditions.

Setting the first threshold value s1 to 3 and the second threshold value s2 to 10 leads to an excellent performance in time-varying channels.

The method can further comprise counting a number of faulty transmissions f and selecting the adapted transmission parameter at a threshold of the number of faulty transmissions $f_T$. This has the advantage that also faulty transmissions are considered and a suitable reaction, e.g. reducing the data rate, can be applied accordingly. In other words, it can, for example, mean switching to a lower data rate immediately after one faulty transmission.

Setting the threshold of the number of faulty transmissions $f_T$ to 1 leads to desirable results.

The method can further comprise selecting the transmission parameters used by a responding node, also referred to as responding receiver or station. For example, the data rate used by that station is taken into account. This allows to use this rate immediately for further communication and can be done as follows. When the transmitting node or station, also referred to as transmitter, receives a frame correctly from a peer station, i.e. the receiver, it checks whether that frame was sent with a rate different to the one it uses currently for transmitting frames to that station. If this is the case, the transmitter may update its transmission rate with the one used by the peer. In an preferred embodiment, the transmitter only updates if the transmission rate used by the peer is higher.

The method provides basically a dynamic link adaptation mechanism that can be implemented in a compatible way with the current IEEE 802.11 MAC specification. Using the mechanism, an IEEE 802.11 compliant transmitter is able to detect whether the quality of a link to a certain destination is improving or declining, and based on this information to select and switch to the adapted transmission parameters, respectively.

In general, the link adaptation mechanism employs the fact that the transmitter does not receive an ACK (acknowledgment) for a data frame sent to a certain receiver as an indicator that the quality of the link to that receiver has worsened and therefore, e.g. a lower transmission rate should be used for future transmissions to that receiver. On the other hand, if the transmitter succeeds to send multiple data frames to a certain receiver, it assumes that the quality of the link has improved and therefore, e.g. a higher rate should be used for future transmissions.

It is advantageous that the mechanism employs only information available at the transmitter side to determine whether the actual link quality is improving or worsening and therefore first does not require the availability of a feedback channel and second remains conform to the standards. This can be achieved by the so-called error recovery procedure defined in the MAC (medium access control) layer of the IEEE 802.11 standard.

The link adaptation method described above can be implemented by having the transmitter maintaining for a certain destination MAC address two counters, one for successful transmissions and one for failed transmissions. If a frame is successfully transmitted, the success counter is incremented by one and the failure counter reset to zero; similarly, if a transmission fails, then the failure counter is incremented by one and the success counter reset to zero. If the failure counter reaches a certain threshold $f_T$, then the transmission rate for the corresponding destination is decreased and the failure counter reset to zero. Similarly, if the success counter reaches a certain threshold $s_T$, i.e. the first threshold value s1 or the second threshold value s2, then, for example, the transmission rate is increased and the success counter reset to zero.

In accordance with another aspect of the present invention, there is provided an apparatus for adapting a transmission parameter to the current link quality of a data communication channel. The adapted transmission parameter is selected from a set of transmission parameters in dependence on a number of successful transmissions s. The number of successful transmissions s is compared against a first threshold value s1 corresponding to a first state of the apparatus or a second threshold value s2 corresponding to a second state of the apparatus. The apparatus comprises a success counter for counting the number of successful transmissions. The apparatus further comprises a selecting unit for selecting the adapted transmission parameter in response to the number of successful transmissions s equaling or exceeding the first threshold value s1 when the apparatus is in the first state and in response to the number of successful transmissions s equaling or exceeding the second threshold value s2 when the apparatus is in the second state. Moreover, the apparatus comprises a decision unit 14 which in dependence of the result of a following transmission informs the selecting unit 12 to operate in the first state or the second state.

Furthermore, the apparatus can comprise a failure counter for counting a number of faulty transmissions, which allows to react on failures in transmission immediately.

DESCRIPTION OF THE DRAWINGS

Preferred embodiments of the invention are described in detail below, by way of example only, with reference to the following schematic drawings.

Figure 1:
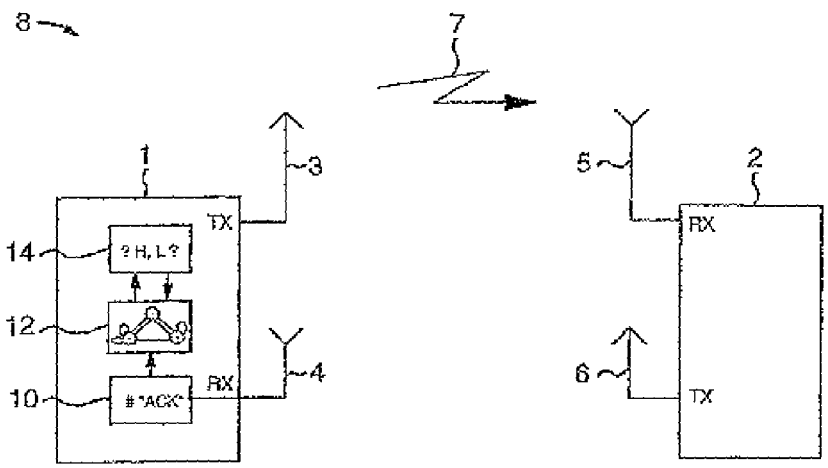
FIG. 1 shows a schematic illustration of a communication environment with a transmitting station and a receiving station.

The drawings are provided for illustrative purpose only and do not necessarily represent practical examples of the present invention to scale.

DETAILED DESCRIPTION

Although the present invention is applicable in a broad variety of transmission applications it will be described with the focus put on an application to wireless systems, i.e. Wireless Local Area Networks (WLAN), using orthogonal frequency division multiplexing (OFDM) as employed in the WLAN standards IEEE 802.11a and HIPERLAN/2. Before embodiments of the present invention are described, some basics, in accordance with the present invention, are addressed.

As the invention takes advantage of the so-called error recovery procedure defined in the MAC (medium access control) layer of the IEEE 802.11 standard, this error recovery procedure is described in more detail below.

The IEEE 802.11 basic access procedure is a distributed procedure based on the known Carrier Sense Multiple Access (CSMA) method used in Ethernet LANs (local area networks). A station with a pending data packet has to sense the state of the wireless medium before it can transmit. If the medium is free longer than a predefined time interval, it can proceed with the transmission. Otherwise it first waits until the medium becomes free, then generates a random backoff time before it tries to transmit to minimize the probability of collision with other stations. MAC (medium access control) frames are protected against errors (due to transmission errors or collisions) by means of a frame check sequence (FCS) field containing a 32-bit cyclic redundancy checksum (CRC) and of a simple send-and-wait automatic repeat request (ARQ) mechanism. If the receiver of a MAC frame detects a CRC error, the frame is discarded. Otherwise, if a MAC (medium access control) frame does not contain a CRC error, the receiver waits for a short, predefined SISF (Short Inter-Frame Space) time and sends an ACK (acknowledge) frame back to the transmitter. If the transmitter does not receive an ACK frame within a specified time, it assumes that the transmitted frame is disturbed and will resend the frame after a random backoff time. The procedure is repeated until the transmitter receives an ACK frame from the receiver, or a maximum life time or a maximum number of retries is reached.

Generally, the performance and efficiency of the presented link adaptation mechanism depends on the thresholds for the number of successful transmissions s and faulty transmissions f. A successful transmission is considered as a reception of an ACK frame. In the event that no ACK frame is received in due time a faulty transmission is assumed. In particular, a success threshold value $s_T$ is represented by a first threshold value s1 that corresponds to a first state H or a second threshold value s2 that corresponds to a second state L for the number of successful transmissions s. A failure threshold value $f_T$ is set for the number of faulty transmissions f. The impact of these values is considered below.

With the failure threshold value $f_T$ of the number of faulty transmissions f one can control how long a transmitter should stay, e.g., at a certain rate before it can assume that the link quality is degraded so that it should switch to a lower rate. A high value of the failure threshold value $f_T$ may impact the performance negatively, in particular when the link quality is degrading rapidly. Various simulation runs have shown that a good value for the failure threshold value $f_T$ is one, i.e. the transmitter should switch immediately to a lower rate after a failed transmission, regardless how fast the quality of the link is changing. The efficiency of a such conservative reaction, even when the quality is changing very slowly or not at all, is explained by the fact that transmissions at a lower rate always have a higher success chance, in particular when the quality of the channel has really worsened.

Figure 3:
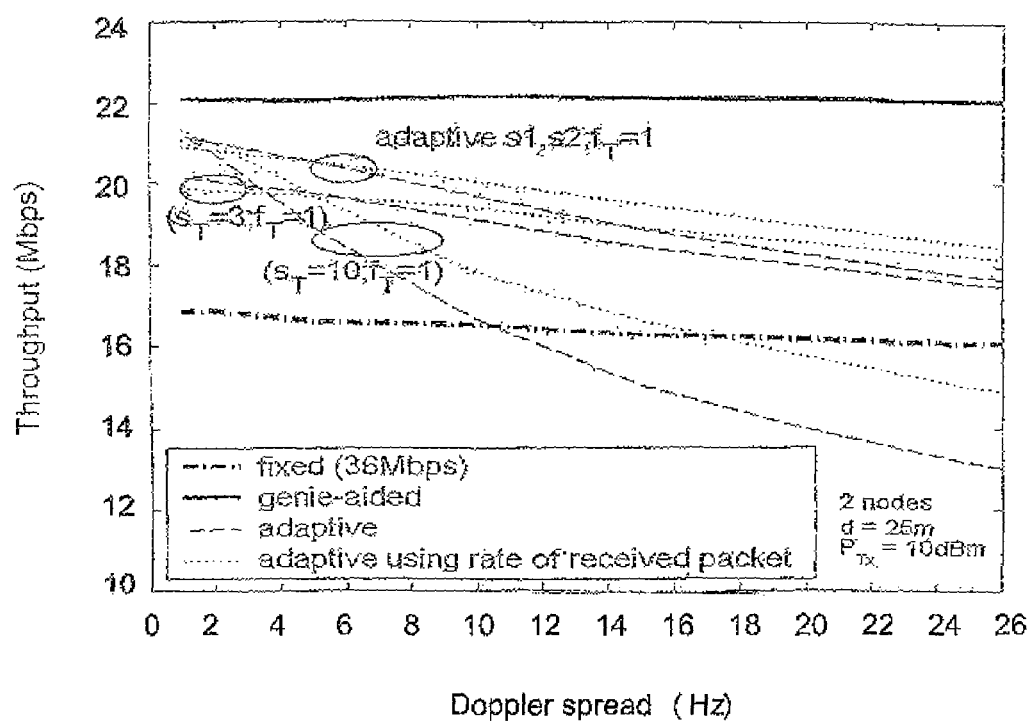
FIG. 3 shows a schematic illustration of the IEEE 802.11a performance in a time-varying channel.

The success threshold value $s_T$, which can equal the first threshold value s1 or the second threshold value s2, defines the maximum number of successful transmissions s which the transmitter should achieve before it can assume that the link quality has improved so that it should switch, e.g., to the next higher data rate. Simulation results reveal that the efficiency of the link adaptation mechanism is sensitive to the value of the success threshold value $s_T$ and therefore to its first threshold value s1 and its second threshold value s2. With reference to FIG. 3 the throughput of a point-to-point link can be represented as a function of the so-called Doppler spread, which is defined as the maximum frequency at which the channel conditions are changing. Low Doppler spread values correspond to links with slowly changing quality and high Doppler spread values correspond to links with fast changing quality. When the link quality is changing slowly, a large value for the success threshold value $s_T$ leads to a better throughput performance. However, it has been recognized that with a large value for the success threshold value $s_T$ the transmitter does not react fast enough to a fast improvement of the link quality. The transmitter is still at a low transmission rate although the quality of the link already allows the use of a higher rate.

With reference to FIG. 1, a general layout of a communication system 8 is described in which the adaptation of a transmission parameter in a transmitting node 1 to the current ink quality of a data communication channel 7 can be used. As indicated in FIG. 1, a signal can be transmitted via the channel 7. Usually, the signal comprises a frame or several frames. The presented embodiment relates to the IEEE 802.11a standard supporting an Orthogonal Frequency Division Multiplexing (OFDM) transmission scheme in the 5 GHz band with variable data rates, i.e. 6 Mbit/s to 54 Mbit/s. FIG. 1 shows the transmitting node 1, hereafter referred to as transmitter 1, and a receiving or responding node 2, hereafter referred to as receiver 2. The transmitter 1 is located at a first location while the receiver 2 is located at a second location. Multiple of the receiver 2 can be arranged (not shown) within a WLAN. The transmitter 1 comprises a first transmit antenna 3 over which a signal, hereafter called sent signal, is transmitted and a first reception antenna 4 with which an ACK (acknowledgment) signal, but also further data, is receivable. Both antennas 3, 4 also can form a unit. The transmitter 1 comprises a success counter 10 connected to a selecting unit 12, which further is connected to a decision unit 14. The transmitter 1 further comprises a failure counter (not depicted), which can be combined with the success counter 10. The success counter 10 counts the number of successful transmissions s whenever one ACK (acknowledgment) signal is received via the first reception antenna 4, because then the sent signal was received by the receiver 2 and acknowledged. The selecting unit 12 gets the number of successful transmissions s from the success counter 10 and switches to an adapted transmission parameter accordingly, as described in more detail below. The adapted transmission parameter can be a different data rate, packet length, or a combination thereof. A set of or multiple different transmission parameters can be provided and used. The decision unit 14 informs the selecting unit 12 in dependence of the result of a subsequent or following transmission which state the selecting unit 12 should use for its further processing. The selecting unit 12 and the decision unit 14 can form a unity. The method of working in the selecting unit 12 is described in more detail with reference to FIG. 2.

The receiver 2 comprises a second reception antenna 5 with which the mentioned sent signal or data is received. A second transmit antenna 6 is used to send the ACK (acknowledgment) signal out if valid data has been received.

Figure 2:
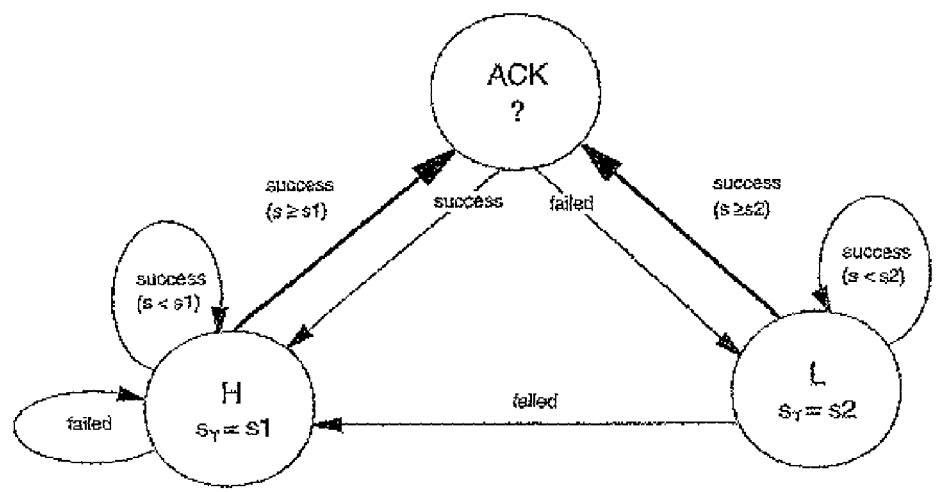
FIG. 2 shows a schematic illustration of a state transition diagram as it is applicable by the transmitting station.

FIG. 2 shows a schematic illustration of a state transition diagram indicating the mechanism as it is applicable by the transmitter 1 in the selecting unit 12. The mechanism allows to estimate qualitatively the changing speed of the link quality and to switch dynamically between a first value s1, also referred to as first threshold value s1, that corresponds to a first state, labeled with H, and a second value s2, also referred to as second threshold value s2, that corresponds to a second state, labeled with L, with s1<s2, depending on whether one is in the region of high Doppler spread values, i.e. first state H with s1 depicted on the left-hand side, or in the region of low spread values, i.e. the second state L with s2 depicted on the right-hand side. The state transition diagram in FIG. 2 indicates three states, the first state H, the second state L, and an intermediate state, labeled with "ACK ?" and depicted above the first and second states H, L in the middle. The states are connected via arrows which represent the transition from one to another state or remaining in one state. The transition conditions are labeled accordingly and expressed as follows:
failed: s:=0, f+, and
  if f≧$f_T$, then down rate and f:=0
means when a transmission failed setting the success counter 10 to zero, incrementing the failure counter and when the number of faulty transmissions f equals at least the threshold of the number of faulty transmissions $f_T$, then reducing the data rate and setting the failure counter to zero, or
success: s+, f:=0, and
  if in state H: s≧s1 or if in state L: s≧s2, then up rate and s:=0
means when a transmission was successful incrementing the success counter 10, setting the failure counter to zero and, when in the first state H the number of successful transmissions s equals or is larger than the first threshold value s1 or when in the second state L the number of successful transmissions s equals or is larger than the second threshold value s2, then increasing the data rate and setting the success counter to zero.

The thick arrow lines indicate the switching to an adapted transmission parameter, e.g. a higher data rate.

In a preferred embodiment the first threshold value s1 equals 3, the second threshold value s2 equals 10, and the threshold of the number of faulty transmissions $f_T$ equals 1.

The mechanism operates as follows. If the number of successful transmissions s equals at least to the first threshold value s1 or the second threshold value s2, then a selection of and switching to an adapted transmission parameter, e.g. a higher data rate, and a transition to the intermediate state "ACK ?" is performed. In the intermediate state "ACK ?" it is waited for the result of the next transmission. In dependence of the result of the next transmission, the first state H or the second state L is used.

If the next transmission succeeds, then it can be assumed that the link quality of the channel 7 is improving rapidly, i.e. high Doppler spread. Therefore, it is moved to the first state H and the success threshold value $s_T$ is set equal to the small first threshold value s1 in order to react quickly to the changing link quality.

If however the next transmission fails, then it is assumed that the link quality of the channel 7 is either changing slowly or not changing at all, i.e. low Doppler spread, and that the former decision to switch to a higher rate was premature. Consequently, it is moved to the second state L and the success threshold value $s_T$ is set equal to the higher second threshold value s2.

If in the first state H a faulty transmission occurs, the first state H is retained and the success threshold value $s_T$ remains equal to s1 as indicated in the figure. However if in the second state L a faulty transmission occurs, it is moved to the first state H and the success threshold value $s_T$ is changed to the first threshold value s1.

FIG. 3 shows a schematic illustration of the throughput performance of an IEEE 802.11a WLAN in a time-varying channel. In more detail, the illustration indicates the throughput of a point-to-point link as a function of the Doppler spread at various values of $s_T$, the threshold of the number of successful transmissions. The two transmission nodes are located 25 m apart and have both the same transmission power of 10 dBm. A frequency-flat channel with Rayleigh fading is considered. An optimal graph, corresponding to an idealized system where the transmitters have perfect channel knowledge, is shown as a thick black line, and runs at about 22 Mbps. Another nearly straight graph at about 17 Mbps, indicates a fixed transmission rate of 36 Mbps, which is the one achieving the best results without rate adaptation. The dashed line with $s_T$=10, $f_T$=1 indicating a first simple adaptive mechanism shows a rapid throughput degradation at high Doppler spreads. The dashed line with s1, s2, $f_T$=1 indicating the adaptive link mechanism which takes into account higher as well as lower Doppler spreads shows a better performance than the dashed line with $s_T$=3, $f_T$=1 indicating a second simple adaptive mechanism which takes more care to higher Doppler spreads. The dotted lines indicate the throughput achievable when the adaptive mechanisms use additionally the data rate of a received packet from the remote station or receiver. Low Doppler spread values correspond to links with slow changing quality and high Doppler spread values correspond to links with fast changing quality. The threshold of the number of faulty transmissions $f_T$ is set for all regarded performance curves to 1. When the link quality is changing slowly, a large value of $s_T$ leads to a better throughput performance, see for example the curve for $s_T$=10; however, the performance degrades rapidly with increasing Doppler spread. With a large value for $s_T$ the mechanism does not react fast enough to a fast improvement of the link quality. The transmitter is still at a low transmission rate although the quality of link already allows the use of a higher rate.

A small value for the success threshold value $s_T$ does improve the throughput at higher Doppler spread values, it however suffers performance degradation at low Doppler spread values, see for example the curve for $s_T$=3. Since the quality of the channel is changing very slowly or not changing at all, with $s_T$=3 the transmitter switches to higher rates too early and therefore fails too often. In general the Doppler spread value of a channel is not known a priori; it also changes dynamically. One possible solution is to measure the spread value in the PHY (physical) layer, which however becomes in praxis very complex. Therefore, the presented link adaptation mechanism allows in an easier way to estimate qualitatively the changing speed of the link quality and to switch dynamically between two values of the success threshold value $s_T$, namely the first threshold value s1 and the second threshold value s2, with s1<s2, depending on whether one is in the region of high Doppler spread values, i.e. the first state H, or in the region of low spread values, i.e. second state L.

The present invention can be realized in hardware, software, or as a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

We claim:

1. An adaptation method comprising steps of:

using a selecting unit in a transmitting node of a data communication system operating under Institute of Electrical and Electronics Engineers (IEEE) section 802.11, in a time-varying channel, to adapt a variable transmission data rate in a transmitting node of a data communication system to a current link quality of a data communication channel, wherein said variable transmission data rate is selected by the transmitting node from a set of transmission data rates;

wherein the selecting unit employs only information available at the transmitting node to determine whether an actual link quality is improving or worsening, the adapting comprising in the transmitting node the steps of:

setting a threshold value of one for faulty transmissions;

setting a minimum threshold value of three for successful transmissions in the time-varying channels;

setting a maximum threshold value of ten for successful transmissions in the time-varying channels;

operating in a first state in response to detecting at least the minimum threshold value but less than the maximum threshold value for successful transmissions from a receiving node, wherein the first state corresponds to a link with fast changing quality;

operating in a second state in response to detecting the maximum threshold value for successful transmissions from the receiving node, wherein the second state corresponds to a link with slow changing quality;

transitioning to the first state when detecting a faulty transmission while operating in the second state;

selecting an adapted data transmission rate by:

comparing a data transmission rate used by the receiving node to a current data transmission rate when the successful transmission is detected;

selecting a new packet length different from an original packet length being used when the data transmission rate used by the receiving node is not higher than the current data transmission rate; and selecting the data transmission rate used by the receiving node in the successful transmission if that data transmission rate is higher than the current data transmission rate;

incrementing a first counter for each successful transmission;

resetting the first counter to zero when a transmission fails; and in dependence of a result of a following transmission causing the method to operate in the first state or the second state.

2. The method of claim 1 wherein the adaptation method further comprises:

incrementing a second counter for each failed transmission; and resetting the second counter to zero when a transaction completes.

3. A non-transitory computer readable storage medium comprising a set of instructions that when executed by a processor cause the computer to perform a method comprising the steps of:

adapting a variable transmission data rate in a transmitting node of a data communication system to a current link quality of a data communication channel wherein the data rate is selected by the transmitting node from a set of transmission data rates;

setting a threshold value of one for faulty transmissions;

setting a minimum threshold value of three for successful transmissions in time-varying channels;

setting a maximum threshold value of ten for successful transmissions in time-varying channels;

operating in a first state of a transmission data rate in response to detecting at least the minimum threshold value but less than the maximum threshold value for successful transmissions, wherein the first state corresponds to a link with fast changing quality;

operating in a second state of a transmission data rate in response to detecting the maximum threshold of successful transmissions, wherein the second state corresponds to a link with slow changing quality;

incrementing a first counter for each successful transmission;

resetting the first counter to zero when a transmission fails;

incrementing a second counter for each failed transmission;

resetting the second counter to zero when a transmission succeeds; and transitioning to the first state when detecting one defective transmission from a receiving node in the network while operating in the second state;

wherein the transmission data rate is changed by:

comparing a data transmission rate used by the receiving node to a current data transmission rate when the successful transmission is detected;

selecting a new packet length different from an original packet length being used when the data transmission rate used by the receiving node is not higher than the current data transmission rate;

selecting the data transmission rate used by the receiving node in the successful transmission if said data transmission rate used by the receiving node is higher than the current data transmission rate; and switching to a lower data transmission rate immediately after a faulty transmission.

4. A data communication network comprising:

a transmitting node of a data communication system operating under IEEE section 802.11, in a time-varying channel;

a success counter for tracking a number of successful transmissions, wherein said success counter is incremented by one for each successful transmission, and wherein said success counter is reset to zero upon detecting a failed transmission;

a failure counter for tracking a number of failed transmissions, wherein said failure counter is incremented by one for each failed transmission, and wherein said failure counter is reset to zero when a transmission succeeds;

a first node comprising a transmitter, said transmitter comprising a variable data transmission rate;

wherein the transmitter comprises a selecting unit adapting a variable transmission data rate in a transmitting node of a data communication system to a current link quality of a data communication channel, wherein said variable transmission data rate is selected by the transmitting node from a set of transmission data rates wherein the step of adapting comprises in the transmitting node the steps of:

setting a threshold value of one for faulty transmissions;

setting a minimum threshold value of three for successful transmissions in time-varying channels;

setting a maximum threshold value of ten for successful transmissions in time-varying channels;

operating in a first state in response to detecting at least the minimum threshold value but less than the maximum threshold value for successful transmissions wherein the first state corresponds to a link with fast changing quality;

operating in a second state in response to detecting the maximum threshold value of successful transmissions, wherein the second state corresponds to a link with slow changing quality;

transitioning to the first state when detecting one defective transmission while operating in the second state;

a second node comprising a receiver; and a link connecting the first and second nodes;

wherein the data transmission rate is changed by:

comparing a data transmission rate used by the receiving node to a current data transmission rate when the successful transmission is detected;

selecting a new packet length different from an original packet length being used when the data transmission rate used by the receiving node is not higher than the current data transmission rate; and selecting the data transmission rate used by the receiving node in the successful transmission if said data transmission rate used by the receiving node is higher than the current data transmission rate.

* * * * *